United States Patent [19]

MacDonald

[11] Patent Number: 5,530,899
[45] Date of Patent: Jun. 25, 1996

[54] ARCHIVAL AND RETRIEVAL SYSTEM ACCESSING AN EXTERNAL STORAGE BY POLLING INTERNAL QUEUES FROM REMOTE TERMINALS MINIMIZING INTERRUPTION OF A HOST PROCESSOR

[75] Inventor: Duncan N. MacDonald, Laguna Niguel, Calif.

[73] Assignee: DMI, Inc., Irvine, Calif.

[21] Appl. No.: 809,912

[22] Filed: Dec. 18, 1991

[51] Int. Cl.⁶ ............................................ G06F 9/00
[52] U.S. Cl. .................. 395/837; 395/859; 364/230.3; 364/230.2; 364/242.2; 364/DIG. 1
[58] Field of Search ................................ 395/275, 200, 395/500, 250, 837, 826, 864, 859, 867, 868

[56] References Cited

U.S. PATENT DOCUMENTS

| | | | |
|---|---|---|---|
| 4,631,674 | 12/1986 | Blandy | 395/700 |
| 4,972,349 | 11/1990 | Kleinberger | 395/144 |
| 5,036,484 | 7/1991 | McCoy et al. | 395/500 |
| 5,163,131 | 11/1992 | Row et al. | 395/200 |
| 5,170,466 | 12/1992 | Rogan et al. | 395/400 |

*Primary Examiner*—Thomas C. Lee
*Assistant Examiner*—Sang Hui Kim
*Attorney, Agent, or Firm*—Baker, Maxham, Jester & Meador

[57] ABSTRACT

An archival and retrieval system which is connected to a host computer through an asynchronous serial line. The system operates unassisted through this serial line and appears like another terminal to the host. The system includes an archival and retrieval workstation containing archival and retrieval software for controlling the memory management operations. A portion of the archival and retrieval software resides in the host and contains archival and retrieval stacks for receiving and storing archive and retrieve requests respectively from user operated terminals. At periodic intervals the archival and retrieval workstation polls the archival and retrieval stacks to see if there are any requests present. If there are, the request is transferred to the workstation and used to either store or fetch the appropriate data item. The archival and retrieval workstation includes an archival storage media such as a optical disk. The archival and retrieval system permits relatively fast access to a large capacity archival storage unit. Since the memory management functions are handled primarily by the archival retrieval workstation, the CPU is freed from these tasks and the response time of the host can thereby be improved.

23 Claims, 3 Drawing Sheets

ARCHIVAL RETRIEVAL SYSTEM

1

ARCHIVAL AND RETRIEVAL SYSTEM ACCESSING AN EXTERNAL STORAGE BY POLLING INTERNAL QUEUES FROM REMOTE TERMINALS MINIMIZING INTERRUPTION OF A HOST PROCESSOR

BACKGROUND

1. Technical Field

The present invention relates to computer memory storage systems and more particularly to a system for managing archival and retrieval tasks for an existing host computer.

2. Discussion

The memory capacity of a computer system is limited by a number of factors. Paramount among these factors is the access time required for the computer to retrieve and make use of stored data. In general, the larger the storage capacity and the more data there is stored, the longer it takes to access this data. Conversely, if only a relatively small storage capacity is required, systems can access this limited data base relatively quickly. Thus, most computer systems represent a compromise between quick access to a small capacity memory at one extreme and slow access to a large capacity memory at the other.

For example, hard disk storage is a relatively quick access but small capacity storage medium. A typical single hard disk can store 200 M bytes of memory and can be accessed in less than one second. Hard disk storage capacity can be increased by adding additional hard disks and drives, however, as the number of disks increases the system throughput will decrease due to the additional time required for the computer to search through all of the disks when attempting to locate a given file.

One alternative is to store infrequently used files on paper, magnetic tape or microfiche. These offer an unlimited amount of archival data storage. However, these methods can be costly and time consuming. First, the physical space required to store information on paper, microfiche or computer tape can be costly. Also, there are significant transfer costs in transferring the information from electronic to the physical media and back again. For example, microfiche and printouts must be reentered to the system either by manually keying in the information, or by utilizing optical character readers. In addition, archival information stored using these methods must first be located manually. This raises the access time significantly. In many cases, the process of requesting, locating and making a file available stored in one of these three methods, can as a practical matter, raise the access times to a matter of days. With microfiche additional problems are often experienced such as the cost of microfiche viewing machines and delays in access to such machines.

Also, hard disk systems are relatively expensive; and as they become larger they become more of a burden on the host to manage. Storage life is another important consideration and with magnetic tape a typical lifetime is six to eight years.

An attractive alternative because of these problems is optical disk storage. An individual optical disk can store up to 1,800 megabytes of compressed data with a storage life of over 15 years. Since the information is written permanently and cannot be erased, these "write-once" disks are among the most permanent form of data storage available. Also, optical disks offer the lowest storage cost per megabyte. Access time is relatively good for optical disks. For example, in a 20 gigabyte optical disk storage system a file can typically be accessed in less than one minute with the optical disk system connected directly to the system bus of a host computer.

While optical disk storage offers a viable replacement for tape libraries and microfilm, it is not without disadvantages. First, the addition of an optical storage system typically requires modifications to the software and/or hardware of the host computer. Further, in the typical configuration with the optical disk connected directly to the system bus of the host, the host CPU can quickly become overloaded in performing tasks associated with managing the transfer of data to and from the optical disk. These tasks include such functions as controlling which transactions are sent out to the archive and when they are sent; and housekeeping functions such as compressing data, and determining where on an optical disk a file is to be stored.

For these reasons, optical disk storage can impose a significant burden on the CPU. Thus, the full potential of optical disk as a data storage medium for computer systems has not yet been realized due to problem in getting data into and out of the host computer as well as managing these processes.

Thus, it would be desirable to provide a system which cost effectively extends the on-line storage capabilities of computer systems. It would also be desirable to provide such a system which has relatively large storage capacity and at the same time which can be accessed in a relatively short amount of time. It would additionally be desirable to provide an archival data storage system which effectively can replace tape libraries and microfilm. Further, it would be desirable to provide an archival data storage system, which can utilize optical data storage media and which can be coupled to a computer system without requiring hardware or software modifications to the host system. Also it would be desirable to provide a system which minimizes the work needed to be accomplished by the host in managing data archival and retrieval functions. In other words, it would be desirable to provide a system which utilizes optical storage media without requiring significant host CPU time. Further, it would be desirable to provide a system with the above features at a moderate cost and which utilizes existing hardware platforms.

SUMMARY OF THE INVENTION

Pursuant to the present invention, a system and method is provided for enabling a host computer system to access an external data storage device. In one aspect of the present invention the system comprises an archival and retrieval computer which is coupled to the host computer and also to the external data storage unit. The archival and retrieval computer includes a program which establishes archive and retrieve queue means for receiving and storing archive and retrieve requests. Also, the program includes a means for periodically polling the archive and retrieve queues to determine if a retrieve or archive request is contained in the queues. In addition there is included a means for retrieving a data file from the external data storage unit in response to a retrieval request in the retrieval queue, and a means for transferring a data file from the host to the external data storage unit in response to an archive request in the archive queue. In this way, the archival and retrieval computer is able to operate unassisted to expand the data storage capacity of the host computer system. In the preferred embodiment, the archival and retrieval computer is connected to the host by means of a serial bus and not through the host computer system bus thus, minimizing the burden on the host CPU to manage the storage and retrieval functions.

In accordance with another aspect of the present invention, a method is provided for enabling a host computer system to access an external data storage unit. The method includes the steps of providing an archival and retrieval computer coupled to the host computer and to the external data storage unit; generating archive and the retrieve request; receiving and storing the archive and the retrieve request and the archive and the retrieve queues located in the host computer; periodically polling the archive and the retrieve queues to determine if a retrieve or archive request is contained therein; retrieving a data file from the external storage unit in response to a retrieve request in the retrieval queue; and transferring a data file from the external storage unit in response to an archive request in the archive queue.

Accordingly, the present invention greatly expands the amount of memory accessible to a computer system without tying up the CPU of host system. Further, the information can accessed in a relatively short period of time when compared to traditional archival storage approaches. Also, the present invention does not require modification to the existing host computer hardware or software.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
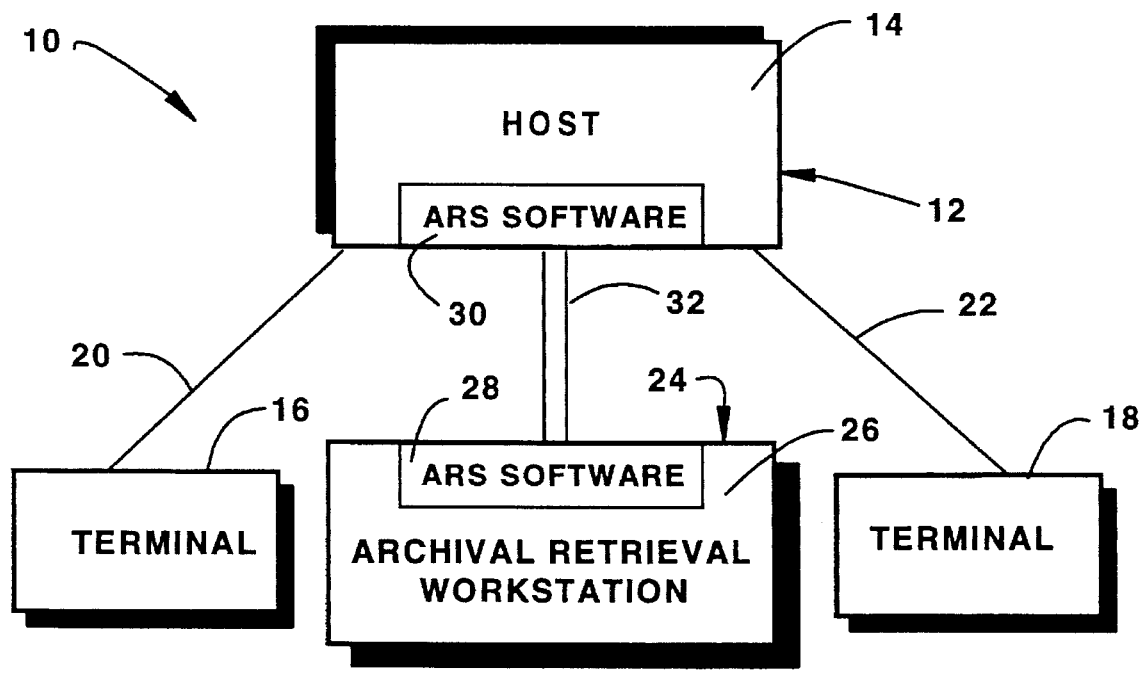
FIG. 1 is an overall diagram of an archival retrieval system in accordance with the present invention.

Referring now to FIG. 1 there is shown an overall diagram of a multi-user computer and archival system 10 in accordance with the present invention. An existing multi-user computer system 12 comprises a CPU 14 and a plurality of conventional terminals 16, 18 connected by means of an asynchronous serial bus 20 and 22. As discussed above, it would be desirable to improve this existing multi-user computer 12 by increasing the amount of memory storage available to it. An archival and retrieval system 24 accomplishes this task.

For example, seldom used hard disk files as well as files from magnetic tape and microfiche archives may be transferred to the archival retrieval system 24 of the present invention. By off-loading the hard disk storage from the host CPU 14 to the Archival Retrieval System (ARS) 24 the CPU 14 will be freed of memory management tasks and will therefor increase its system throughput. Also, by transferring archival data previously stored on magnetic tape, paper or microfiche, to the ARS system 24, the access time for these files will be decreased from hours or days to the order of seconds. Retrieval can be accomplished from any of the terminals 16, 18 in the existing system 12.

The ARS 24 includes an archival retrieval workstation 26, ARS software 28 resident in the archival retrieval workstation station 26, and a second ARS software module 30 resident in the host CPU unit 14. The archival retrieval workstation 26 is connected to the host by means of an asynchronous serial line 32 which is essentially identical to the asynchronous lines 20 and 22. As will be apparent from the following discussion, the archival retrieval workstation station 26 is adapted to interact with the host 24 in a manner which mimics the operation of one of the terminals 16 and 18. As a result, modifications to the host 14 are not required and the host CPU time is not burdened by managing archival functions as it would be if the archival memory where connected to the host system bus in a conventional manner.

The ARS software 30 in the host occupies a storage location which corresponds to the storage location provided for each of the terminals 16 and 18. For example, where, as in the preferred embodiment discussed below, the host 14 utilizes the multi-user operating system and database manager known as PICK available from Pick Systems, Inc. of Irving, Calif., each terminal has an account or directory which is the storage location where the user of the terminal logs on to a particular part of the system that has his files. The host thus gives this terminal a specified area where the user of the particular terminal can store information and use particular programs. Thus, to the host 14 the ARS system 24 appears to be another terminal with the ARS software 30 residing in the account. The main distinction being that while terminal 16 and 18 are user operated, the ARS system 24 operates unassisted under control of the ARS software modules 28 and 30.

Figure 2:
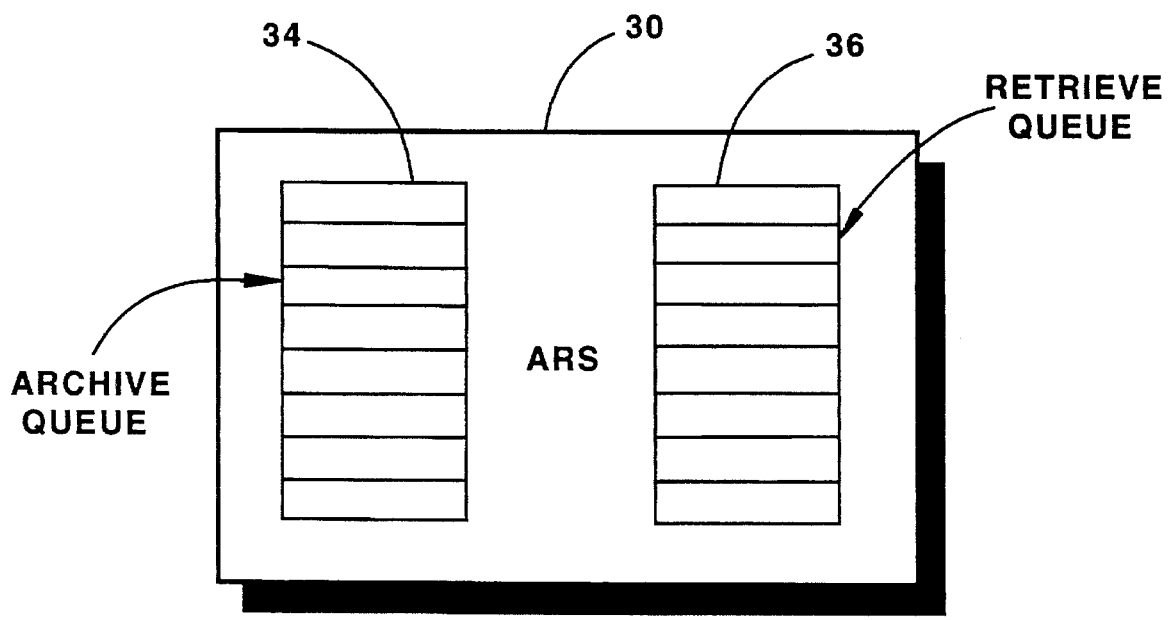
FIG. 2 is a diagram of the archival and retrieval software resident in the archival retrieval workstation station in accordance with the present invention.

The system 10 of the present invention operates as follows. The ARS software 30 is uploaded to an account in the host CPU 14. The ARS software module 30 establishes two queues in the ARS account, one for archiving and another for retrieving. Referring now to FIG. 2, the ARS software module 30 is shown including the archive queue 34 and retrieve queue 36 which each comprise first in - first out (FIFO) stacks. The archival retrieval workstation station 26 periodically polls the archival and retrieval queues 34, 36 to determine if archival or retrieval requests are present. An archival request is a request by one of the terminals 16, 18 that a file be stored in archival memory. The archival request is established when a user writes an item (a PICK file) into the archival queue 34. When this archival request is detected by the ARS workstation 26, the file to be archived is transferred to an archival storage disc (such as an optical disc) contained in the ARS workstation station 26. A record of the file's location is then established on the archival workstation 26.

A retrieval request is a command from one of the terminals 16 and 18 to transfer the contents of a file on the archival disk in the ARS workstation station 26 to the terminal. The retrieval request is established when a user writes an item into the retrieval queue 36. When the retrieval request is detected by the ARS workstation 26 the file to be retrieved is transferred from the archival disk through asynchronous line 32 to the host CPU 14 and in turn to the requesting terminal. Lists of files to be archived can be handled with a single request to minimize system overhead. The workstation station 26 does most of the work in handling archival and retrieval transactions, so that host's overhead is minimized. In a preferred embodiment the ARS software 24 also automatically compresses the data for storage to achieve maximum storage capacity.

Figure 3:
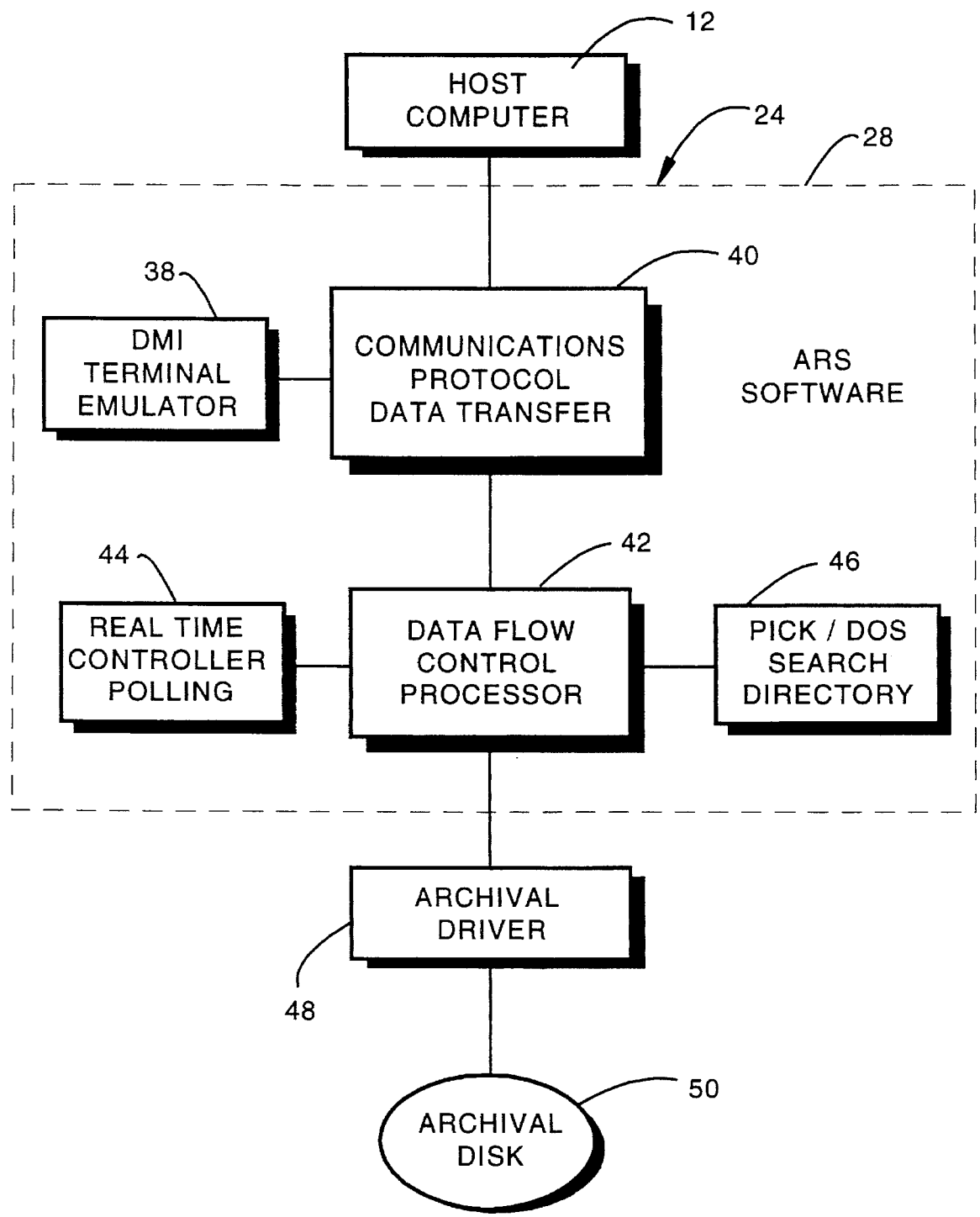
FIG. 3 is a diagram of the archival retrieval software resident in the host computer in accordance with the present invention.

In a preferred embodiment, a sophisticated error handling subsystem returns system errors not only to the workstation 26 itself, but also to the host 14 and the user terminals 16, 18 so that corrective action can be taken, even though the workstation is running unattended. As a result, archiving and retrieving of files can take place in a completely automated unattended mode without interference with normal host 14 operations. Referring now to FIG. 3 the ARS system 24 is shown in more detail. The ARS workstation hardware may comprise a conventional PC, for example, an IBM compatible computer running DOS. A terminal emulator 36 is used to log the ARS system 24 onto the host 14. The ARS software program 28 is then called. Once it is initiated, the ARS software 26 takes control of the workstation 26 (which is being used as a server), and operates automatically without operator attendance. It will be appreciated that there are a number of commercially available terminal emulation programs which enable a PC to be used as a terminal. The ARS system may actually contain multiple terminal emulations and the user may select among those. One example of an appropriate terminal emulation for the present invention is one known as the ADDS Viewpoint manufactured by HCR Corporation of Dayton, Ohio.

The terminal emulator 38 is connected to a communication protocol data transfer module 40 which handles low level communications control and transfer of data in both directions along the asynchronous line 32. Also, it controls the error correction operations including packetizing and check summing and disassembly (which conventional procedures for assuring error free data transfer). A data flow control processor 42 is the central control software that sequences events within the ARS software 28. It controls the timing and sequencing and tells the rest of the modules within the program what to do next and then calls them when it needs them.

A real time controller polling module 44 is a timer that tells the system when (how often) to look for archive and retrieve requests. The time between polling can be set by the user and will depend on how much traffic there is. The timing used will be balanced against the response time requirements which will go down if the time between requests is long. On the other hand, frequent requests will result in frequent interruptions of the host. Between polling requests, the ARS software 28 is inactive. If requests are present the data flow control processor 42 initiates a data transfer.

The data flow control processor 42 also invokes a search directory 46 to allocate a new file name for each new archival request and to store the file's statistics and the new archival file name for later referencing during retrieval. The search directory is stored on the workstation 26 hard disk and is updated every time a new archival request is processed. It generates a structured cross index of the location of the archive files on the host and the location on the archival storage medium. Thus it is a cross index that can be used to search when looking for a particular item both on archival and retrieval. In an archival operation the original archival item will have in it the name of the file from the host and that name will be entered in the directory 46 along with where its going to go on the archival disk. This results in a DOS location stored in a linked list with the original file name and its original location on the host. An archival driver 48 is also connected to the work station 26 which is a readily available commercial software program used to drive an archival disk 50. For example, in the preferred embodiment the archival disk 50 is an optical disk unit and the archival driver is an optical disk driver. It will be appreciated that the archival driver 48 is a kind of emulator which permits an optical disk to be plugged into a DOS operating system causing the optical disk to look like a hard disk to the operating system. Since an optical archival disk 50 is being treated like another DOS disk drive, optical platters can be copied, duplicated, or backed up using standard DOS techniques and software.

In operation, at intervals set by the real time controller 44 the ARS software 28 will poll the archive and retrieve queues 34, 36 to see if any archival or retrieval requests are present. If requests are present the data control processor 42 will initiate a data transfer. If it is an archival request, a new file name will be allocated in the search directory 46 and the file statistics and new archival name will be stored. The data item to be filed is compressed (at approximately 3:1 in the preferred embodiment) archived and stored on the archival disk 50.

Retrieval is the inverse of archiving. The ARS software 28 looks to see if a retrieval request has been filed in the archival queue 34. If it has, the account, file and item number are transferred to the data flow processor 42 and a match to the archival location file is made using the search directory 46. The retrieval item is then retrieved, decompressed and uploaded to the host 14. In the preferred embodiment retrieval requests take precedence over archival requests to minimize the retrieval response time.

Particular details of a preferred embodiment of the present invention will be discussed below. In the preferred embodiment the archival retrieval workstation 28 is a PC comprising a CPU such as a 80286,80386SX, or 80386 running at 12 MHz or better with 640 KB ram minimum. Also, the workstation 26 runs under MS DOS 3.3 (or greater". A serial port is used to connect to the host computer at 19,200 BAUD and another at 2400 BAUD. The system has a minimum of 44 MB hard disk with tape backup for hard disk. The ARS software 28 is configured to run on a dedicated PC since it is an on-line application designed for continuous service in an unattended operating environment. An uninterrupted power supply is recommended to avoid the possibility of data loss or corruption in the event of a power failure during a archival or retrieval operation.

The ARS software will typically contain references to three drives: 1) the default drive that contains the ARS software 26 and will hold the indexing file (which will grow larger at the number of archiving operations increases); 2) a drive that will be used as a scratch disk to create and delete temporary files; and 3) the optical drive. The ARS software 28, 30 can be contained on three floppy disks (360K each). The first disk will contain the ARS operating programs 28; the second will contain the ARS software 30 for uploading to the host computer; and the third will contain utility programs.

The ARS system 24 in the preferred embodiment interfaces with a PICK host computer 14 which may comprise any one of a number of well known minicomputers such as the ADDS R83. The ARS software 30 can be installed from the workstation 26 directly or over a modem. There are four main parameters that control the communications from a terminal or workstation station to a PICK host. These may be set as follows. Communication port - COM1; transmission rate (BAUD) - 19,200; number of data bits - 8; and number of stop bits - 1; number of parity bits - 0. It should be noted that it is important that the host software does not reset these values on the archival port without warning and they are restored if the system goes down and comes back up with default settings.

Figure 4:
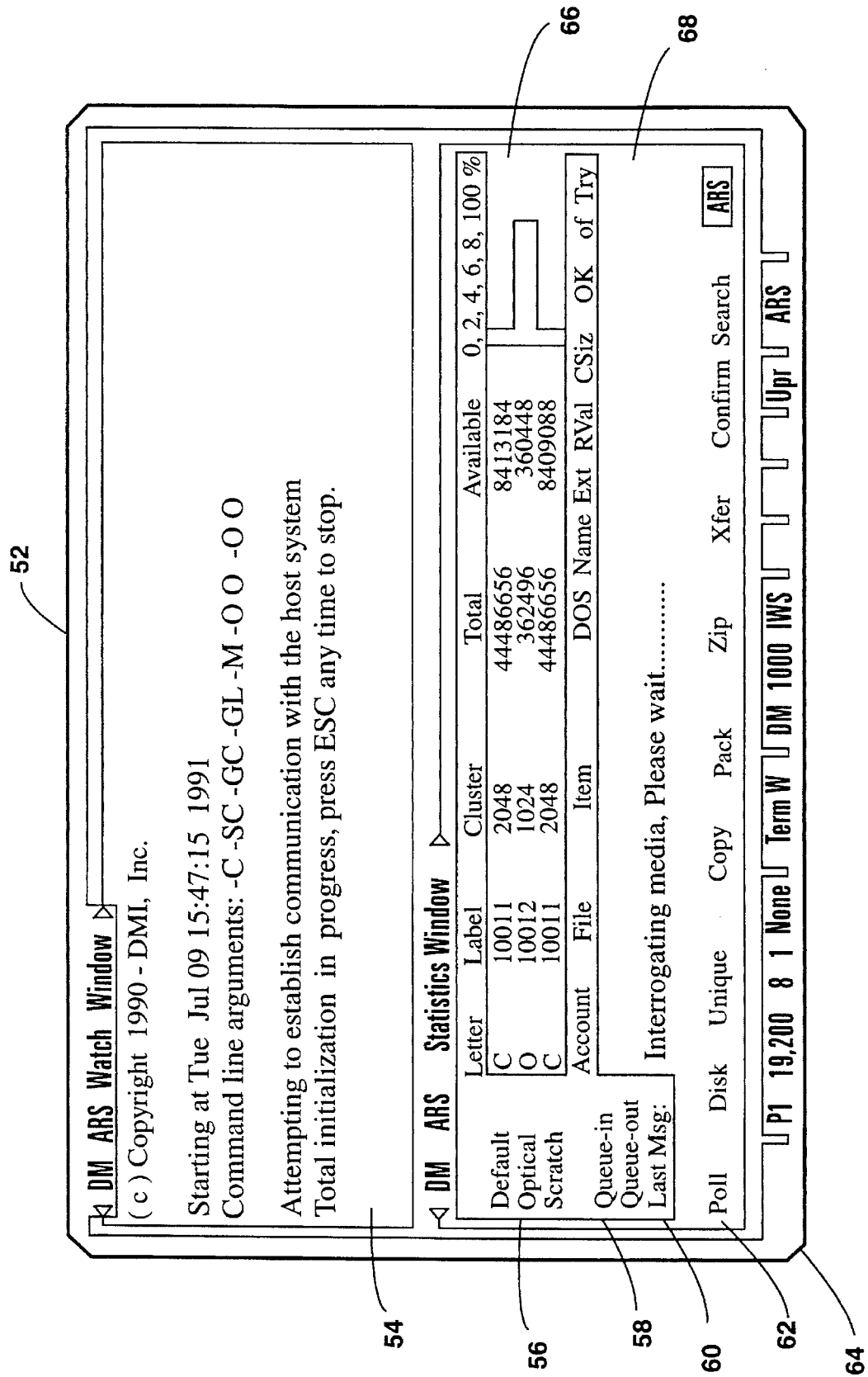
FIG. 4 is a drawing of a watch window which indicates the status of various functions of the present invention.

Referring now to FIG. 4 an ARS display 52 is shown. This display is particularly useful in debugging since it displays the sequence of events currently going on including the status of archival operations and systems status. It includes a split screen where the top window 54 displays operating system and error messages. The bottom window tracks archival/retrieval request processing and shows the status of ARS files. In more detail, the first line 54 shows the operating system messages. Next line 56 shows the status of the three disk areas used during operations including remaining capacities. Line 60 indicates the last informational message which permits the monitoring of the status of each archival/retrieval request. Line 62 is an activity bar. Only one activity is highlighted at a given time. This bar can be used for timing analysis of system performance. During remote diagnostics, this indicates which routine the ARS is performing. Line 64 is the communications bar which indicates which port is being used and the setting of communication parameters. Line 66 gives important information about each drive area's parameters. The cluster size is the minimum amount of disk storage which will be allocated to any given file. The bars provide a visual indication of remaining unused disk space. Lines 58 and 68 displays the data associated with each archive request. The RVal is the return value to PICK, CSiz is the number of clusters the file occupies on the ARS hard disk or optical subsystem, and the OK field is designed to monitor the progress of the session.

In the preferred embodiment the workstation 26, while able to operate unassisted, also can provide a list of options and features available which permits the user to choose a level of user friendliness that is most suitable. In particular, the workstation 26 can be operated in a terminal mode in which a number of functions are assigned to the function keys F1–F10.

It should be noted that it is important to frequently back-up the workstation's hard disk which contains the vital cross index directory used to retrieve files from the archival disk. Since the optical drive is treated as a normal DOS drive by the software, backup can be done by copying the contents of drive C to a separate optical platter, using the DOS copy command, or to a tape cartridge using a tape backup unit. Backup to floppy disk is technically possible but time consuming, since most directories will be at least 20 megabytes in size. It may also be advisable to store copies of the optical platters in a separate location as part of an overall disaster recovery plan. The data on the optical platter is permanently written and cannot be erased and has a life in excess of 15 years. Nevertheless, to protect against fire or other disasters they can be copies to tape for off premises data storage using standard DOS tape backup systems, or duplicate platters can be recorded using a dual drive system and standard DOS copy commands.

New optical platters can be used but must first be formatted very much in the manner of formatting floppy disks.

The programming interface of the preferred embodiment will now be discussed. The ARS system 24 operates from an account named ARS on the PICK host 14. In this account there are two files named QUEUE-IN (retrieval queue 36) and QUEUE-OUT 3 (archive queue 34) which are used to establish a list of items to be archived, and a list of items retrieved. The ARS software polls these files to see if any items are waiting to be processed and then takes the appropriate transfer action when an active item is detected. An archive action is taken by writing the archive item (received from a user terminal 16, 18) to the QUEUE-OUT (archive queue 34) file. A retrieval action is initiated by writing the retrieval item to the QUEUE-IN file. Because of this software architecture, there is minimum archival overhead on the part of the PICK host; most of the work is done by the archival workstation 24.

The archival and retrieval request have an identical format of 11 attributes, and all attributes must be present and contain a value, using the following format; (in PICK systems the hierarchy of file structure goes from account, to item to attributes to values).

1. Q
2. Host account
3. Host file
4. Host item
5. Return code
6. Archival storage location (returned information)
7. Archival volume label (returned information)
8. Transferred to another count (after retrieval)
9. Transfer to another file (after retrieval)
10. Transfer to another item (after retrieval)
11. Returned time/date.

In the preferred embodiment the following rules apply. 1) All attributes must have a value; and 2) Attributes where a return value is expected after archiving should be set to negative 1 (5–7). A returned value of negative 1 should trigger an unconditional error. As an example, the following is a valid item to move a data object to the archival medium or to retrieve a data object from archival. Note that while the item is identical, archival items will be located in the archive queue 34 while retrieval items will be transferred to the retrieval queue 36.

| REQUEST | CONFIRMATION |
| --- | --- |
| 0. User Defined ID | APR90:L1B1:AEO11A3B |
| 1. Q | Q |
| 2. APR90 | −1 |
| 3. L1B1 | −1 |
| 4. AEO11A3B | −1 |
| 5. −1 | 0 |
| 6. −1 | E:\DATAzzVOL00001.FIL |
| 7. −1 | 13 |
| 8. −1 | −1 |
| 9. −1 | −1 |
| 10. −1 | −1 |
| 11. −1 | Thu Jan0312:20:53 1991 |

Notice that the value −1 in attributes 8 through 10 remains −1 since no return value is called for. The return value of 0 in attribute 5 is the only valid error free return value. Attributes 8 and 9 can be used to direct a transfer of an archival/retrieval data object to or from another account for pre- or post-processing.

In the preferred embodiment, multiple items may also be archived or retrieved in one request. This results in much faster transaction rates since the overhead time of a move is divided over several items. A list can be specified in two ways:

1. Use the ARS account to assemble the list of items. For example, the file of assembled items might be named MYLIST. Enter the filename in attribute 4 of the archival or retrieval request surrounded by brackets: [MYLIST] MYLIST is an object in the pointer file which can be generated with a SSELECT and saved with the SAVE-LIST verb.

2. When the list is to be processed from a foreign account (an account not currently logged onto), create a data file in the archival account (say FOREIGN-LIST). Place in this file an item termed ARS, which contains the item-IDs of each foreign item to be archived. Next, create a valid archival/retrieval request specifying the account and file which contains the data objects to be archived. However, in attribute 4 specify the foreign list name with this syntax: {FOREIGN-LIST/ARS}. The ARS will then perform a "QSELECT" to generate a list. As each item is archived, a confirmation item will be returned.

For convenience, the user may specify more than one filename in attribute 3 of the request, separated by multi-values.

A typical optical platter in the archival disk 50 has an uncompressed storage capacity of 325 megabytes per side, or 650 MB per platter. To increase this capacity the data can be compressed which will enable the platter to store 1.8 gigabytes, or 300 percent of the original capacity. The ARS software 28 determines automatically if a file or list of files is long enough to benefit from compression and executes the compression. If compressed, the file name on the optical disk will have a .ZIP extension. If the file is archived uncompressed, it will have a .FIL extension.

Since PICK files or file lists are stored in a "cluster" of data space, even a single character file will occupy about 5K of archival storage. For this reason, compression is of no benefit on short files. For the same reason, much more efficient file storage is achieved by batching items to be archived, and archiving the batch. There is a tradeoff, since individual items will have to be extracted from the batch after retrieval and this takes time. On balance the most efficient batch size is one having two megabytes.

With regard to error reporting, the application developer can chose from a very simple to a very automatic error handling process. Analyzing the confirm message in attribute 5, and looking for any special items in the confirmation files called ERROR will be sufficient in most simple cases. Either one of these events can be used to trigger simple error messages at the originating user's terminal. A more extensive analysis of the simple error message is always available in the watch window of the ARS workstation station shown in FIG. 4.

From the foregoing it can be seen that the present invention provides a cost effective system for expanding the storage capabilities of an existing computer system. The system offers quick access (on the order of seconds) to a relatively large storage capacity. The system can be used with optical data storage media without hardware or software modifications to the host system. By operating in a manner similar to a terminal connected to the host, the ARS workstation 26 of the present invention minimizes the burden on the host CPU in managing data archival and retrieval functions. The data storage capacity is virtually unlimited since multiple archival drivers and disks 48, 50 may be added to a single ARS workstation station 24. In addition, optical disk "juke boxes", each holding up to 50 optical disks may be employed to greatly expand the memory capacity without unduly slowing the access time. Further, multiple archival retrieval workstation 24 may be employed with a single host to further add to the memory capability. Those skilled in the art can appreciate that other advantages can be obtained from the use of this invention and that modification may be made without departing from the true spirit of the invention after studying the specification drawings and following claims.

What is claimed is:

1. In a computer system including a plurality of remote terminals, an external data storage unit and a host computer system having memory and a processor running a first operating system, a system for accessing said external data storage unit using said remote terminals while minimizing interruption of said processor comprising:

an external data storage unit;

a programmable archival and retrieval computer system including memory and a processor running a second operating system and being coupled to said host computer and said external data storage unit, said archival and retrieval computer system including:

archive and retrieve queue means installed in said host computer system for receiving and storing archive and retrieve requests received by said host computer system from said plurality of terminals; and archival and retrieval unit coupled to and remote from said host, said archival and retrieval unit including:

means for periodically polling said archive and retrieve queues to determine if a retrieve or archive request is contained therein;

means for retrieving a data file from said external data storage unit in response to a retrieve request in said retrieval queue; and means for transferring a data file from said host computer system to said external data storage unit in response to an archive request in said archive queue, whereby the archival and retrieval computer system is able to operate unassisted to expand the data storage capacity of said host computer system; and wherein said archival and retrieval unit is resident in one of said plurality of terminals and wherein archive and retrieve requests originate from another of said plurality of terminals.

2. The system of claim 1 further comprising a terminal emulator for enabling said archival and retrieval computer to emulate a terminal on the host computer operating system, whereby said archival and retrieval computer appears to be a terminal to said host.

3. The system of claim 1 wherein said external data storage unit is an optical data storage unit.

4. The system of claim 1 wherein said archival and retrieval computer further includes communications protocol data transfer means for controlling the transfer of information to and from said archival and retrieval computer.

5. The system of claim 4 wherein said communication protocol data transfer means performs packetizing and check summing of said data to be transferred, wherein errors in said transfers are detected.

6. The system of claim 1 wherein said archival and retrieval computer further comprises data flow control processor means for controlling the timing and sequencing of events and functions of said archival and retrieval computer.

7. The system of claim 1 wherein said archival and retrieval computer further comprises a search directory for generating structured cross-indexes of the location of files on the host to be archived and of locations on the external data storage unit.

8. The system of claim 1 further comprising:

an archival driver means coupled to said archival and retrieval computer for enabling said external data storage unit to interface with said archival and retrieval computer.

9. The system of claim 1 wherein said archival and retrieval computer is coupled to said host by means of an asynchronous serial bus.

10. The system of claim 1 wherein said archival and retrieval computer includes a host module residing in said host, said host module including said archival and retrieval queue means.

11. The system of claim 10 wherein said archival and retrieval queue means comprises first in first out stacks.

12. The system of claim 1 wherein said host computer system includes multiple terminals and contains a data base manager and operating system.

13. The system of claim 1 wherein said archival and retrieval computer further comprises means for compressing said data file before archiving said data file in said external data storage unit.

14. In a computer system including a host computer system, having memory and a processor running a first operating system, and a plurality of remote terminals, a method of enabling access to an external data storage unit comprising the steps of:

providing an archival and retrieval computer including memory and a processor running a second operating system, being resident in at least one of said plurality of remote terminals and being coupled to said host computer system and to said external data storage unit;

generating archive and retrieve requests using another of said plurality of remote terminals;

receiving and restoring said archive and retrieve requests in archive and retrieve queues installed located in said host computer system;

periodically polling said archive and retrieve queues from an archival and retrieval unit remote from said host computer system to determine if a retrieve or archive request is contained therein;

retrieving a data file from said external data storage unit in response to a retrieve request in said retrieval queue; and transferring a data file from said external data storage unit in response to an archive request in said archive queue, whereby said archival and retrieval computer is able to operate unassisted to expand the data storage capacity of said host computer system.

15. The method of claim 14 wherein said host computer includes multiple terminals, and said method further comprises the steps of receiving and storing archive and retrieve requests from said terminals.

16. The method of claim 14 further comprising the step of emulating a terminal to enable said archival and retrieval computer to interact with said host computer in a manner similar to that of a terminal.

17. The method of claim 14 wherein the step of transferring a data file further comprises the step of transferring a data file to an optical data storage unit.

18. The method of claim 14 further comprising the step of providing a communications protocol data transfer module and controlling the transfer of information to and from said archival and retrieval computer by means of said communications protocol transfer module.

19. The method of claim 14 further comprising the step of packetizing and check summing said data to be transferred, wherein errors in said transfer are detected.

20. The method of claim 14 further comprising the step of providing a data flow control processor module in said archival and retrieval computer, and controlling the timing and sequencing of events and functions of said archival and retrieval computer in said data flow control processor module.

21. The method of claim 14 further comprising the steps of generating structured cross indexes of the location of the files on the host to be archived and locations on the external data storage unit.

22. The method of claim 14 further comprising the step of coupling said archival and retrieval to said host by means of an asynchronous serial bus.

23. The method of claim 14 further comprising the step of compressing said data.

* * * * *